(12) United States Patent
Hamada et al.

(10) Patent No.: US 10,333,697 B2
(45) Date of Patent: Jun. 25, 2019

(54) NONDECREASING SEQUENCE DETERMINING DEVICE, METHOD AND PROGRAM

(71) Applicant: NIPPON TELEGRAPH AND TELEPHONE CORPORATION, Chiyoda-ku (JP)

(72) Inventors: Koki Hamada, Musashino (JP); Dai Ikarashi, Musashino (JP); Naoto Kiribuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 95 days.

(21) Appl. No.: 15/516,175

(22) PCT Filed: Oct. 5, 2015

(86) PCT No.: PCT/JP2015/078184
§ 371 (c)(1),
(2) Date: Mar. 31, 2017

(87) PCT Pub. No.: WO2016/056502
PCT Pub. Date: Apr. 14, 2016

(65) Prior Publication Data
US 2017/0302437 A1    Oct. 19, 2017

(30) Foreign Application Priority Data
Oct. 8, 2014   (JP) .................................. 2014-206942

(51) Int. Cl.
*G06F 7/16*   (2006.01)
*G06F 9/44*   (2018.01)
(Continued)

(52) U.S. Cl.
CPC .............. *H04L 9/0618* (2013.01); *G06F 7/16* (2013.01); *G06F 9/44* (2013.01); *G06F 17/16* (2013.01);
(Continued)

(58) Field of Classification Search
None
See application file for complete search history.

(56) References Cited

U.S. PATENT DOCUMENTS

| 2012/0002807 A1* | 1/2012 | Michiels | ................. H04L 9/002 380/28 |
| 2015/0095136 A1* | 4/2015 | Jalali | .................. G06Q 30/0242 705/14.41 |
| 2016/0350520 A1* | 12/2016 | Michiels | ................... H04L 9/06 |

OTHER PUBLICATIONS

Manral et al, "Issues with Existing Cryptographic Protection Methods for Routing Protocols", Oct. 2010, IETF Request for Comments: 6309, p. 1-21.*

(Continued)

*Primary Examiner* — Christopher A Revak
(74) *Attorney, Agent, or Firm* — Oblon, McClelland, Maier & Neustadt, L.L.P.

(57) ABSTRACT

Determination as to whether a nondecreasing sequence exists or not is efficiently made. A sorting part sorts elements of a set $P_i$ in ascending order to generate vectors $t_{i,i+1}$ and $b_{i,i+1}$. A merging part generates vectors $t_{0,m}$ and $b_{0,m}$ by repeating the process of merging vectors $(t_{i,j}, b_{i,j})$ and $(t_{j,k}, b_{j,k})$ to generate $(t_{i,k}, b_{i,k})$. A stable-sorting part generates a vector e by coupling and stably sorting vectors $b_{i,j}$ and $t_{j,k}$. A searching part searches for sets of $(\lambda, x, y)$ in which $e[\lambda]$ is $b_{i,j}[x]$ and $e[\lambda+1]$ is $t_{j,k}[y]$ and generates a set X including all x and a set Y including all y. An extracting part sorts $t_{i,j}[x]$ ($x \in X$) in ascending order to generate a vector $t_{i,k}$ and sorts $b_{j,k}[y]$ ($y \in Y$) in ascending order to generate a vector $b_{i,k}$. If the length of a vector $t_{0,m}$ is 0, a determining part outputs a (Continued)

result of determination that indicates the absence of a nondecreasing sequence.

8 Claims, 4 Drawing Sheets

(51) Int. Cl.
  *H04L 9/06* (2006.01)
  *H04L 9/08* (2006.01)
  *H04L 9/14* (2006.01)
  *G06F 17/16* (2006.01)
(52) U.S. Cl.
  CPC ............... *H04L 9/085* (2013.01); *H04L 9/14* (2013.01); *H04L 2209/46* (2013.01)

(56) References Cited

OTHER PUBLICATIONS

International Search Report dated Dec. 8, 2015 in PCT/JP2015/078184 filed Oct. 5, 2015.

Chida, Koji et al., "A Three-Party Secure Function Evaluation with Lightweight Verifiability Revisited," CSS2010, 2010, 6 pages.

Hiroki, Harada et al., "A Polynomial Time/Space Algorithm for Oblivious Regular Expression Matching Algorithm," SCIS, 2014, 10 pages (with English Translation).

Hamada, Koki et al., "Oblivious Radix Sort: An Efficient Sorting Algorithm for Practical Secure Multi-party Computation," IACR Cryptology ePrint Archive, vol. 2014, 2014, 19 pages.

Sasakawa, Hirohito et al., "Oblivious Evaluation of Non-deterministic Finite Automata with Application to Privacy-Preserving Virus Genome Detection," WPES, 2014, pp. 21-30.

Extended European Search Report dated May 4, 2018 in European Patent Application No. 15849344.5 citing document AX therein, 9 pages.

"Sorting algorithm—Wikipedia", Retrieved from the Internet: XP055468944, Oct. 7, 2014, pp. 1-11.

Office Action dated Jan. 21, 2019 in European Application No. 15849344.5.

* cited by examiner

NONDECREASING SEQUENCE DETERMINING DEVICE, METHOD AND PROGRAM

TECHNICAL FIELD

The present invention relates to an applied cipher technique and, in particular, to a method for determining whether a nondecreasing sequence exists without revealing input data.

BACKGROUND ART

There is a method, called secure computation, for obtaining computational results without decrypting encrypted numerical values (see Non-patent literature 1, for example). In the method in Non-patent Literature 1, encryption is performed that distributes pieces of a numerical value are distributed among three secure computers and the three secure computers cooperate to perform a computation, thereby enabling the result of an addition, subtraction, addition by a constant, multiplication, multiplication by a constant, or logical operation (negation, AND, OR, or exclusive-OR) or data format conversion (integer, binary) to be held in such a manner that the result is distributed among the three secure computers without reconstructing the numerical value, that is, with the result being kept encrypted.

One method of accomplishing pattern matching of character sequences on secure computation is a method described in Non-patent literature 2. In the method in Non-patent literature 2, pattern matching is accomplished by evaluating a nondeterministic finite automaton represented by a pattern character by character in an input text.

PRIOR ART LITERATURE

Non-Patent Literature

Non-patent literature 1: Koji Chida, Koki Hamada, Dai Ikarashi, Katsumi Takahashi: "A three-party secure function evaluation with lightweight verifiability revisited", CSS, 2010

Non-patent literature 2: Hiroki Harada, Hirohito Sasakawa, Hiroki Arimura, Jun Sakuma, "A Polynomial Time/Space Algorithm for Oblivious Regular Expression Matching Algorithm", SCIS, pp. 1-8, 2014

SUMMARY OF THE INVENTION

Problems to be Solved by the Invention

However, the existing technique in Non-patent literature 2 requires $\Omega(n)$ rounds of multiplications, where n is the length of an input text in pattern matching. A process for determining whether a text matches a pattern after positions of partial character strings in the pattern are identified in pattern matching can be abstracted to the problem of determining whether a nondecreasing sequence can be created by selecting elements one by one from each set of a sequence of sets.

An object of the present invention is to efficiently determine whether a nondecreasing sequence exists by selecting elements one by one from each set of a sequence of sets.

Means to Solve the Problem

To solve the problem described above, a nondecreasing sequence determining device according to the present invention comprises: a sorting part taking inputs of m sets $P_0, \ldots, P_{m-1}$ and sorting elements of a set $P_i$ in ascending order for $i=0, \ldots, m-1$ to generate a vector $t_{i,i+1}$ and a vector $b_{i,i+1}$; a merging part merging vectors $t_{0,1}, \ldots, t_{m-1,m}$ to generate a vector $t_{0,m}$ and merging vectors $b_{0,1}, \ldots, b_{m-1,m}$ to generate a vector $b_{0,m}$ by repeating a process of merging vectors $(t_{i,j}, b_{i,j})$ and vectors $(t_{j,k}, b_{j,k})$ that satisfy $0 \le i < j < k \le m$ to generate vectors $(t_{j,k}, b_{j,k})$; and a determining part outputting a result of determination that indicates the absence of a nondecreasing sequence if the length of the vector $t_{0,m}$ is 0 and outputting a result of determination that indicates the presence of a nondecreasing sequence if the length of the vector $t_{0,m}$ is greater than or equal to 1. The merging part comprises: a stable-sorting part coupling a vector $b_{i,j}$ with a vector $t_{j,k}$ and stably sorting elements of a resulting vector to generate a vector e; a searching part searching the vector e for every set of $(\lambda, x, y)$ in which $e[\lambda]$ is $b_{i,j}[x]$ and $e[\lambda+1]$ is $t_{j,k}[y]$ and generating a set X including all of found x and a set Y including all of found y; and an extracting part sorting elements $t_{i,j}[x]$ ($x \in X$) of a vector $t_{i,j}$ in ascending order to generate a vector $t_{i,k}$ and sorting elements $b_{j,k}[y]$ ($y \in Y$) of a vector $b_{j,k}$ in ascending order to generate a vector $b_{i,k}$.

Effects of the Invention

The nondecreasing sequence determining technique according to the present invention determines in $O(\log m)$ rounds whether a nondecreasing sequence exists by selecting elements one by one from each of m sets. Accordingly, whether a nondecreasing sequence exists can be efficiently determined. This enables efficient pattern matching for texts.

DETAILED DESCRIPTION OF THE EMBODIMENTS

Figure 1:
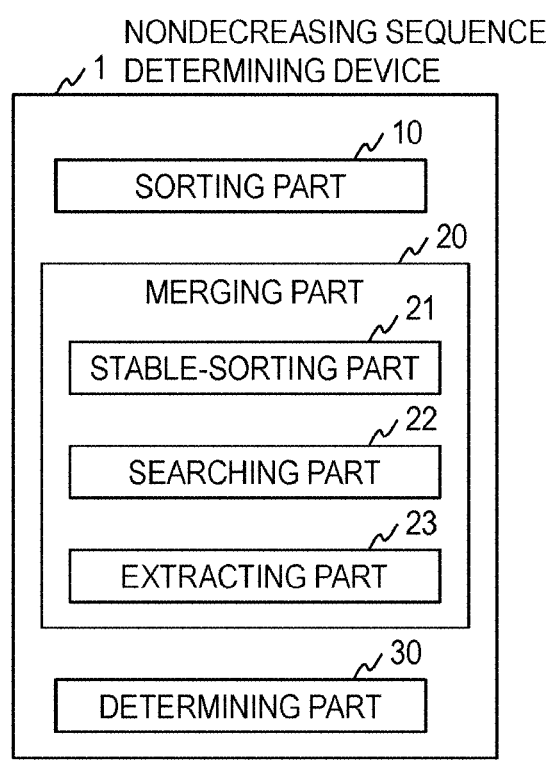
FIG. 1 is a diagram illustrating a functional configuration of a nondecreasing sequence determining device according to a first embodiment.

Before describing embodiments, notation and the definitions of terms used herein will be given.

Notation

A value "a" concealed by encryption or secret sharing is referred to as a secret text of "a" and denoted as <a>. If secret sharing is used for concealment, a set of pieces of a shared secret held by secure computing devices is referred to by <a>.

The i-th row of a matrix X is denoted by X[i]. The i-th element of a vector u is denoted by u[i]. A whole matrix of resulting from concealing the elements of a matrix X is denoted by <X> and is referred to as a secret text of X. A whole vector resulting from concealing the elements of a vector "u" is denoted by <u> and referred to as a secret text of "u".

⌈●⌉ [Formula 1]

is the ceiling function and means the smallest integer greater than or equal to ●.

⌊●⌋ [Formula 2]

is the floor function and means the greatest integer smaller than or equal to ●.

●$^T$ denotes the transpose of ●.

<Addition, Subtraction, Multiplication>

Addition, subtraction and multiplication take inputs of secret texts <a>, <b> of two values a, b and yield secret texts <$c_1$>, <$c_2$> and <$c_3$>, respectively, as the results of the computations, a+b, a−b, and ab, respectively. The executions of the operations are written as follows:

$$<c_1> \leftarrow \text{Add}(<a>,<b>),$$

$$<c_2> \leftarrow \text{Sub}(<a>,<b>),$$

$$<c_3> \leftarrow \text{Mul}(<a>,<b>) \quad [\text{Formula 3}]$$

Note that when there is no risk of misunderstanding, Add (<a>, <b>), Sub (<a>, <b>) and Mul (<a>, <b>) are simply denoted as <a>+<b>, <a>−<b> and <a>×<b>, respectively.

<Logical Operations>

Logical OR, logical AND, and negation operations take inputs of secret texts <a>, <b> of two values a, b∈{0, 1} and yield secret texts <$c_1$>, <$c_2$> and <$c_3$>, respectively, of the results $c_1$, $c_2$, and $c_3$ of logical OR of "a" and "b", logical AND of "a" and "b" and negation of "a", respectively. The executions of the operations are written as follows:

$$<c_1> \leftarrow <a> \vee <b>,$$

$$<c_2> \leftarrow <a> \wedge <b>,$$

$$<c_3> \leftarrow \neg <a> \quad [\text{Formula 4}]$$

The logical operations are accomplished by computations of the following formulas:

$$<c_1> \leftarrow <a>+<b>-<a>\times<b>,$$

$$<c_2> \leftarrow <a>\times<b>,$$

$$<c_3> \leftarrow 1-<a> \quad [\text{Formula 5}]$$

<Sort Operation>

Sort is an operation that sorts elements of a vector in ascending order and outputs the resulting vector. The vector k'=(k'[0], . . . , k'[n−1]) output for an input vector k=(k[0], . . . , k[n−1]) is a vector resulting from sorting of the elements of k that satisfy k'[0]≤ . . . ≤k'[n−1].

Stable sort is an operation which preserves the original order of elements having the same value, if present, in the sort operation. Elements of vectors k and k' satisfy k'[$\pi_s$(i)]=k[i] for a given bijection $\pi_s${0, . . . , n−1}→{0, . . . , n−1} and the following formula holds in the stable sort.

$$\pi_s(i)<\pi_s(j) \Leftrightarrow (k[i]<k[j]) \vee (k[i]=k[j] \wedge i<j) \quad [\text{Formula 6}]$$

A stable sort operation in secret computation dealt with in the following description takes inputs of a plurality of vectors and, in accordance with sorting of the elements of a vector used as a key, sorts the elements of another vector. Specifically, a stable sort operation takes inputs of a vector k having a size n used as the key in the stable sort and secret texts <k>, <$a^{(0)}$>, . . . , <$a^{(\lambda-1)}$> of a number λ, (1≤λ) of vectors $a^{(0)}$, . . . , $a^{(\lambda-1)}$ having the size n and calculates secret texts <$b^{(0)}$>, . . . , <$b^{(\lambda-1)}$> of vectors $b^{(0)}$, . . . , $b^{(\lambda-1)}$ in which the elements of each vector $a^{(0)}$, . . . , $a^{(\lambda-1)}$ are sorted in accordance with the order of the elements of the vector k sorted by the stable sort.

$$<b^{(0)}>, \ldots, <b^{(\lambda-1)}> \leftarrow \text{StableSort}(<a^{(0)}>, \ldots, <a^{(\lambda-1)}>;<k>) \quad [\text{Formula 7}]$$

Key reveal sort is processing in which a key is revealed in a stable sort operation. The processing is more efficient than processing performed with the key being concealed and, if the configuration of values included in the key is known, there is no risk of unnecessarily revealing information. The execution of the operation is written as follows.

$$<b^{(0)}>, \ldots, <b^{(\lambda-1)}> \leftarrow \text{RevealSort}(<a^{(0)}>, \ldots, <a^{(\lambda-1)}>;<k>) \quad [\text{Formula 8}]$$

Concealment, reconstruction, addition, subtraction and multiplication may be accomplished by using methods described in Non-Patent Literature 1. Stable sort and key reveal sort may be accomplished by using a method described in Koki Hamada, Dai Ikarashi, Koji Chida, and Katsumi Takahashi, "Oblivious radix sort: An efficient sorting algorithm for practical secure multi-party computation", IACR Cryptology ePrint Archive, vol. 2014, p. 121, 2014 (Reference literature 1)".

<Nondecreasing Sequences>

The nondecreasing sequence determining technique is a method for determining whether a vector p that is a nondecreasing sequence having a size m form sets $P_0, P_1, \ldots, P_{m-1}$ (where p[i]∈$P_i$(0≤i<m) and p[0]≤p[1]≤ . . . ≤p[m−1]).

For example, assume that sets $P_0, P_1, \ldots, P_4$ are as follows.

$P_0$={0, 3, 7, 8, 10}
$P_1$={2, 5, 8, 9}
$P_2$={2, 4, 8}
$P_3$={0, 4, 7, 9}
$P_4$={0, 6, 7}

For example, the vector $P_0$={0, 8, 2, 4, 6} satisfies $p_0$[i]∈$P_i$(0≤i<m) but does not satisfy $p_0$[0]≤$p_0$[1]≤$p_0$[2]≤$p_0$[3]≤$p_0$[4] because $p_0$[1]>$p_0$[2], and therefore the vector $p_0$ is not a nondecreasing sequence.

On the other hand, for example, the vector $p_1$=(0, 2, 4, 4, 6) satisfies $p_1$[i]∈$P_i$(0≤i<m) and also satisfies $p_1$[0]≤$p_1$[1]≤$p_1$[2]≤$p_1$[3]≤$p_1$[4] and therefore the vector $p_1$ is a nondecreasing sequence.

Embodiments of the present invention will be described below in detail. Note that components that has like functions are given like reference numerals in drawings and repeated description of the components will be omitted.

First Embodiment

As illustrated in FIG. 1, a nondecreasing sequence determining device 1 according to a first embodiment comprises a sorting part 10, a merging part 20 and a determining part 30. The merging part 20 comprises a stable-sorting part 21, a searching part 22 and an extracting part 23, for example.

The nondecreasing sequence determining device 1 is a special device configured by installing a special program into a well-known or dedicated computer comprising a central processing unit (CPU), a random access memory (RAM) and other components. The nondecreasing sequence determining device 1 executes processes under the control of the CPU, for example. Data input into the nondecreasing sequence determining device 1 and data obtained through the processes are stored in the RAM and the data stored in the RAM is read and used in other processes as needed, for example.

Figure 2:
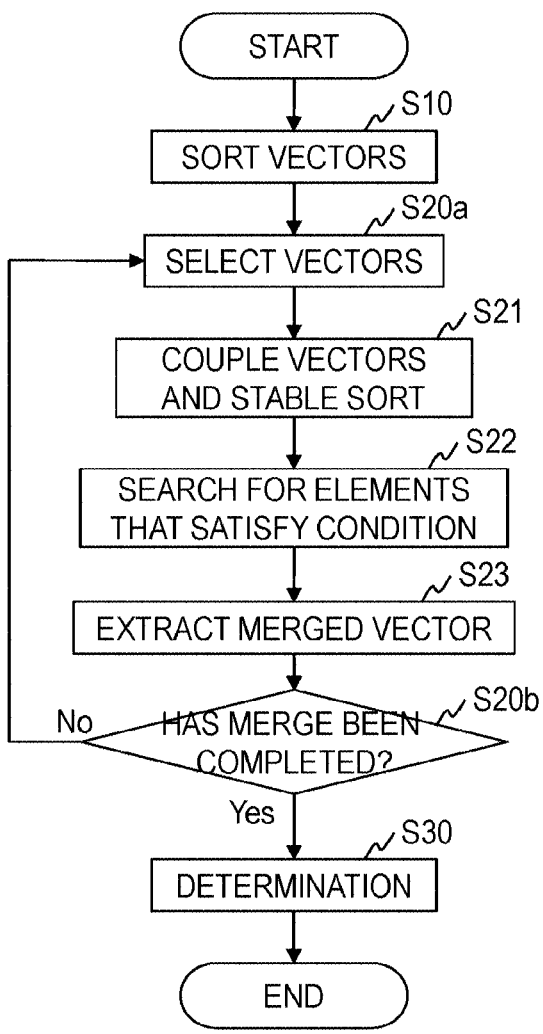
FIG. 2 is a diagram illustrating a process flow of a nondecreasing sequence determining method according to the first embodiment.

A nondecreasing sequence determining method according to the first embodiment will be described below with reference to FIG. 2.

The nondecreasing sequence determining method according to the first embodiment takes inputs of m sets $P_0, \ldots, P_{m-1}$ and returns 1 if a vector p that is a nondecreasing sequence having a size m exists or returns 0 if not.

At step S10, the sorting part 10 sorts the elements of a set $P_i$, where $i=0, \ldots, m-1$, in ascending order to generate vectors $t_{i,i+1}$ and $b_{i,i+1}$. Specifically, the sorting part 10 sorts the elements of a set $P_0$ in ascending order to generate vectors $t_{0,1}$ and $b_{0,1}$, sorts the elements of a set $P_1$ in ascending order to generate vectors $t_{1,2}$ and $b_{1,2}$, and sorts the elements of a set $P_{m-1}$ in ascending order to generate vectors $t_{m-1,m}$ and $b_{m-1,m}$.

At step S20a, the merging part 20 selects vectors $(t_{i,j}, b_{i,j})$ and $(t_{j,k}, b_{j,k})$, merges the vectors $(t_{i,j}, b_{i,j})$ and $(t_{j,k}, b_{j,k})$ by a process from step S21 to step S23 to generate vectors $(t_{i,k}, b_{i,k})$. By recursively performing the process, the merging part 20 merges vectors $t_{0,1}, \ldots, t_{m-1}, \ldots, t_{m-1,m}$ to generate a vector $t_{0,m}$ and merges vectors $b_{0,1}, \ldots, b_{m-1,m}$ to generate a vector $b_{0,m}$.

At step S21, the stable-sorting part 21 couples the vector $b_{i,j}$ and vector $t_{j,k}$ together and stably sorts the elements in ascending order to generate a vector e.

At step S22, the searching part 22 searches the vector e for every set $(\lambda, x, y)$ in which $e[\lambda]$ is $b_{i,j}[x]$ and $e[\lambda+1]$ is $t_{j,k}[y]$ and generates a set X that includes all of found x and a set Y that includes all of found y.

At step S23, the extracting part 23 sorts $t_{i,j}[x]$ ($x \in X$) in ascending order to generate a vector $t_{i,k}$ and sorts $b_{j,k}[y]$ ($y \in Y$) to generate a vector $b_{i,k}$.

At step S20b, the merging part 20 determines whether all of the vectors $t_{0,1}, \ldots, t_{m-1,m}$ and vectors $b_{0,1}, \ldots, b_{m-1,m}$ have been merged. In other words, the merging part 20 determines whether vectors $(t_{0,m}, b_{0,m})$ have been generated. If the merge has not been completed, the process returns to step S20a. If merge has been completed, the process proceeds to step S30.

At step S30, if the length of a vector $t_{0,m}$ is 0, the determining part 30 outputs 0 indicating the absence of a nondecreasing sequence. If the length of a vector $t_{0,m}$ is greater than or equal to 1, the determining part 30 outputs 1 indicating the presence of a nondecreasing sequence.

An example will be used to show that the presence of a nondecreasing sequence can be determined by the method described above.

Assume that sets $P_0, P_1, \ldots, P_4$ are as follows.
$P_0=\{0, 3, 7, 8, 10\}$
$P_1=\{2, 5, 8, 9\}$
$P_2=\{2, 4, 8\}$
$P_3=\{0, 4, 7, 9\}$
$P_4=\{0, 6, 7\}$ Since a nondecreasing sequence is $p[i] \in P_i (0 \leq i < m)$ and $p_i[0] \leq p_1[1] \leq p_1[2] \leq p_1[3] \leq p_1[4]$, there are nondecreasing sequences such as (0, 2, 2, 4, 6), (0, 2, 2, 4, 7), (0, 2, 4, 4, 6), (0, 2, 4, 4, 7) and (0, 2, 4, 7, 7), for example, in sets $P_0, P_1, \ldots, P_4$.

At step S10, the following vectors $t_{0,1}, \ldots, t_{4,5}$ and $b_{0,1}, \ldots, b_{4,5}$ are generated.
$t_{0,1}=b_{0,1}=(0, 3, 7, 8, 10)$
$t_{1,2}=b_{1,2}=(2, 5, 8, 9)$
$t_{2,3}=b_{2,3}=(2, 4, 8)$
$t_{3,4}=b_{3,4}=(0, 4, 7, 9)$
$t_{4,5}=b_{3,4}=(0, 6, 7)$ At step S20a, i=0, j=1, and k=2 are set and vectors $(t_{0,1}, b_{0,1})$ and $(t_{1,2}, b_{1,2})$ are selected and merged by performing steps S21 to S23 described below to generate vectors $(t_{0,2}, b_{0,2})$.

At step 21, the following vector e is generated from the vectors $b_{0,1}$ and $t_{1,2}$.
e=(0, 2, 3, 5, 7, 8, 8, 9, 10)
$=(b_{0,1}[0], t_{1,2}[0], b_{0,1}[1], t_{1,2}[1], b_{0,1}[2], b_{0,1}[3], t_{1,2}[2], t_{1,2}[3], b_{0,1}[4])$ At step S22, the following sets of $(\lambda, x, y)$ are found.
$(\lambda=0, x=0, y=0)$,
$(\lambda=2, x=1, y=1)$,
$(\lambda=5, x=3, y=2)$
Therefore, set $\lambda=\{0, 1, 31\}$ and set Y=\{0, 1, 2\}.

At step S23, the following vectors $(t_{0,2}, b_{0,2})$ are generated.
$t_{0,2}=(t_{0,1}[0], t_{0,1}[1], t_{0,1}[3])=(0, 3, 8)$
$b_{0,2}=(b_{1,2}[0], b_{1,2}[1], b_{1,2}[2])=(2, 5, 8)$ At step S20b, vectors $t_{0,5}$ and $b_{0,5}$ do not exist and therefore the process returns to step S20a.

In the second round of step S20a, i=2, j=3 and k=4 are set, vectors $(t_{2,3}, b_{2,3})$ and $(t_{3,4}, b_{3,4})$ are selected and merged vectors $(t_{2,4}, b_{,2,4})$ are generated in the same way as described above.

The vector $b_{2,3}=(2, 4, 8)$ and the vector $t_{3,4}=(0, 4, 7, 9)$ are coupled together and stable sort is performed to generate the following vector e.
e=(0, 2, 4, 4, 7, 8 9)
$=(t_{3,4}[0], b_{2,3}[0], b_{2,3}[1], t_{3,4}[1], t_{3,4}[2], b_{2,3}[2], t_{3,4}[3])$
Then, $(\lambda=2, x=1, y=1)$ and $(\lambda=5, x=2, y=3)$ are found and therefore X=(1,2) and Y=(1, 3). Accordingly, the vectors $(t_{2,4}, b_{2,4})$ are as follows.
$t_{2,4}=(t_{2,3}[1], t_{2,3}[2])=(4, 8)$
$b_{2,4}=(b_{3,4}[1], b_{3,4}[3])=(4, 9)$ In the third round of step S20a, i=2, j=4 and k=5 are set, vectors $(t_{2,4}, b_{2,4})$ and $(t_{4,5}, b_{4,5})$ are selected and merged vectors $(t_{2,5}, b_{2,5})$ is generated in the same way as described above.

The vector $b_{2,4}-(4, 9)$ and the vector $t_{4,5}-(0, 6, 7)$ are coupled together and stable sort is performed to generate the following vector e.
e=(0, 4, 6, 7, 9)
$=(t_{4,5}[0], b_{2,4}[0], t_{4,5}[1], t_{4,5}[2], b_{2,4}[1])$
Then, $(\lambda=1, x=0, y=1)$ is found and therefore X=(0) and Y=(1). Accordingly, the vectors $(t_{2,5}, b_{2,5})$ are as follows.
$t_{2,5}=(t_{2,4}[0])=(4)$
$b_{2,5}=(b_{4,5}[1])=(6)$ In the fourth round of step S20a, i=0, j=2 and k=5 are set, vectors $(t_{0,2}, b_{0,2})$ and $(t_{2,5}, b_{2,5})$ are selected and merged vectors $(t_{0,5}, b_{0,5})$ are generated in the same way as described above.

The vector $b_{0,2}=(2, 5, 8)$ and the vector $t_{2,5}=(4)$ are coupled together and stable sort is performed to generate the following vector e.
e=(2, 4, 5, 8)
$=(b_{0,2}[0], t_{2,5}[0], b_{0,2}[1], b_{0,2}[2])$
Then, $(\lambda=0, x=0, y=0)$ is found and therefore X=(0) and Y=(0). Accordingly, the vector $(t_{0,5}, b_{0,5})$ is as follows.
$t_{0,5}=(t_{0,2}[0])=(0)$
$b_{0,5}=(b_{2,5}[0])=(6)$ At step S20b, since vectors $t_{0,5}$ and $b_{0,5}$ exist, the process proceeds to step S30.

At step S30, since the length of $t_{0,5}$ is not 0, 1 indicating the presence of a nondecreasing sequence is output as the result of determination.

Second Embodiment

In a nondecreasing sequence determining device according to a second embodiment, a merging part 20 sets i, j, and k such that the following formula is satisfied, and vectors $(t_{i,j}, b_{i,j})$ and vectors $(t_{i,k}, b_{i,k})$ are selected for generating vectors $(t_{i,k}, b_{i,k})$.

$$j = \left\lfloor \frac{i+k}{2} \right\rfloor \qquad \text{[Formula 9]}$$

By configuring as described above, the merging part 20 can obtain vectors $(t_{0,m}, b_{0,m})$ with a recursive procedure in $$\lceil \log_2 m \rceil \qquad \text{[Formula 10]}$$

rounds.

Third Embodiment

A third embodiment is a method of determining whether a nondecreasing sequence exists by using secure computation. In the third embodiment, each iteration of a recursive procedure can be accomplished in O(1) rounds of computations and therefore the whole process can be accomplished in O(log m) rounds.

Figure 3:
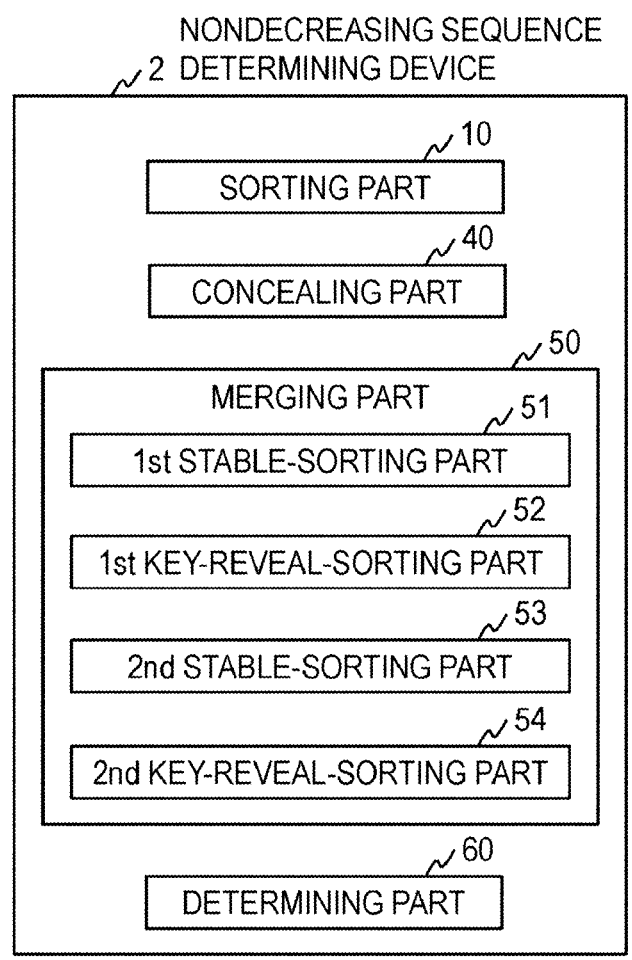
FIG. 3 is a diagram illustrating a functional configuration of a nondecreasing sequence determining device according to a third embodiment.

As illustrated in FIG. 3, a nondecreasing sequence determining device 2 according to the third embodiment comprises a sorting part 10, a concealing part 40, a merging part 50, and a determining part 60. The merging part 50 comprises a first stable-sorting part 51, a first key-reveal-sorting part 52, a second stable-sorting part 53 and a second key-reveal-sorting part 54, for example.

Figure 4:
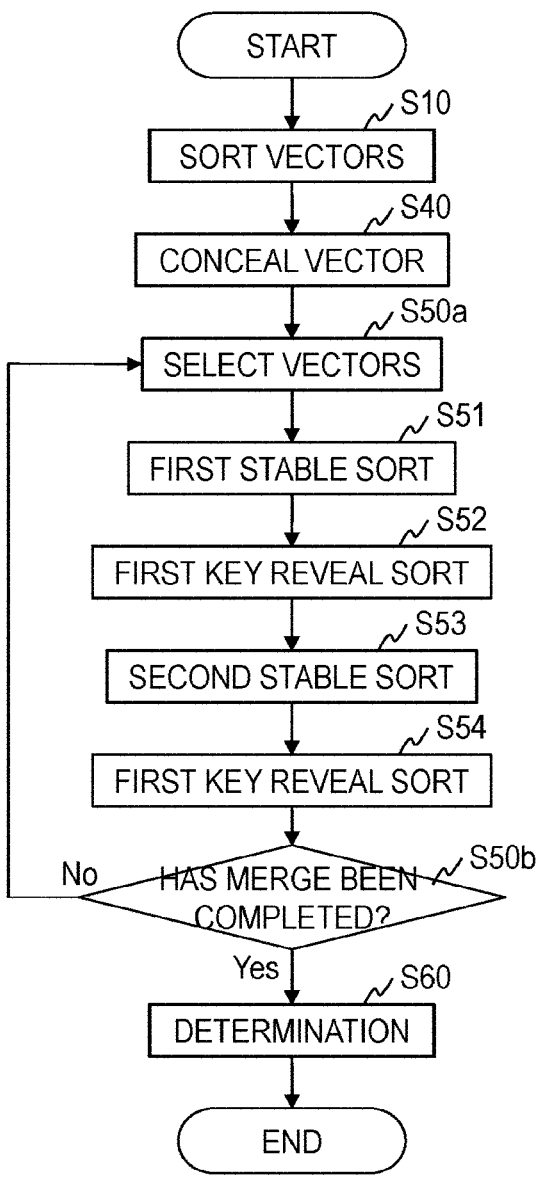
FIG. 4 is a diagram illustrating a process flow of a nondecreasing sequence determining method according to the third embodiment.

A nondecreasing sequence determining method according to the third embodiment will be described below with reference to FIG. 4. The following description focuses on differences from the first embodiment described above.

At step S40, the concealing part 40 determines that each of the elements of a set $P_i$, where $i=0, \ldots, m-1$, is greater than or equal to 0 and less than n, and converts a vector to a vector to generate an encrypted text $<t'_{i,i+1}>$ in which the vector $t_{i,i+1}$ is concealed in accordance with the following formula.

$$t'_{i,i+1}[k] = \begin{cases} 1 & \text{if } \exists \lambda \text{ s.t. } t_{i,i+1}[\lambda] = k, \\ 0 & \text{otherwise} \end{cases} \qquad \text{[Formula 11]}$$

Similarly, the concealing part 40 converts a vector $b_{i,i+1}$ to a vector $b'_{i,i+1}$ to generate an encrypted text $<b'_{i,i+1}>$ in which the vector $b_{i,i+1}$ is concealed in accordance with the following formula.

$$b'_{i,i+1}[k] = \begin{cases} 1 & \text{if } \exists \lambda \text{ s.t. } b_{i,i+1}[\lambda] = k, \\ 0 & \text{otherwise} \end{cases} \qquad \text{[Formula 12]}$$

Examples of vectors $t'_{i,i+1}$ and $b'_{i,i+1}$ are given below. For example, assume that sets $P_0, P_1, \ldots, P_4$ are as follows.
$P_0 = \{0, 3, 7, 8, 10\}$
$P_1 = \{2, 5, 8, 9\}$
$P_2 = \{2, 4, 8\}$
$P_3 = \{0, 4, 7, 9\}$
$P_4 = \{0, 6, 7\}$
Let n=12, then vectors $t'_{i,i+1}$ and by $b'_{i,i+1}$ are as follows.
$t'_{0,1} = b'_{0,1} = (1, 0, 0, 1, 0, 0, 0, 1, 1, 0, 1, 0)$,
$t'_{1,2} = b'_{1,2} = (0, 0, 1, 0, 0, 1, 0, 0, 1, 1, 0, 0)$,
$t'_{2,3} = b'_{2,3} = (0, 0, 1, 0, 1, 0, 0, 0, 1, 0, 0)$,
$t'_{3,4} = b'_{3,4} = (1, 0, 0, 0, 1, 0, 0, 1, 0, 1, 0, 0)$,
$t'_{4,5} = b'_{4,5} = (1, 0, 0, 0, 0, 0, 1, 1, 0, 0, 0, 0)$ At step S50a, the merging part 50 selects a secret text $(<t'_{i,j}>, <b'_{i,j}>)$ and a secret text $(<t'_{j,k}>, <b'_{j,k}>)$ that satisfy $0 \leq i < j < k \leq m$ and merges the secret text $(<t'_{i,j}>, <b'_{i,j}>)$ and the secret text $(<t'_{j,k}>, <b'_{j,k}>)$ together by the process from step S51 to step S54 to generate a secret text $(<t'_{j,k}>, <b'_{j,k}>)$. By recursively performing the process, the merging part 50 merges secret texts $<t'_{0,1}>, \ldots, <t'_{m-1,m}>$ to generate a secret text $<t'_{0,m}>$ and merges secret texts $<b'_{0,1}>, \ldots, <b'_{m-1,m}>$ to generate a secret text $<b'_{0,m}>$.

At step S51, the first stable-sorting part 51 alternately arranges elements of a secret text $<b'_{i,j}>$ and elements of secret text $<t'_{j,k}>$ to generate a secret text $<a>$. Specifically, the first stable-sorting part 51 generates a secret text $<a>$ for $h=0, \ldots, n-1$ in accordance with the following formula.

$$<a[2h]> \leftarrow <b'_{i,j}[2h]>,$$

$$<a[2h+1]> \leftarrow <t'_{j,k}[2h+1]> \qquad \text{[Formula 13]}$$

The first stable-sorting part 51 then generates a secret text $(<f>, <a'>, <p>)$ by stably sorting $(<(0, 1)^n>, <a>, <(0, \ldots, 2n-1)>)$ using $\neg <a>$ as a key, where $(0, 1)^n$ is a vector that is composed of 0s and 1s and has a length of 2n. Specifically, the stable-sorting part 51 performs stable sort written as follows.

$$(\langle f' \rangle, \langle a' \rangle, \langle p \rangle) \leftarrow \text{StableSort}(\langle 0,1\rangle^n), \langle a \rangle, \langle (0, \ldots, 2n-1) \rangle); \qquad \text{[Formula 14]}$$

$$\neg \langle a \rangle) \text{ where } (0,1)^n = \overline{(0,1,0,1, \ldots, 0,1)}^{2n}$$

At step S52, the first key-reveal-sorting part 52 generates a secret text $<m>$ for $h=0, \ldots, n-1$ in accordance with the following formula.

$$<m[h]>$$

$$\leftarrow <a[h]> \times (\neg <f'[h]> \times <f'[h+1]> + <f'[h]> \times \neg <f'[h-1]>) \qquad \text{[Formula 15]}$$

The first key-reveal-sorting part 52 then generates a secret text $<m'>$ by key-reveal sorting the secret text $<m>$ using a secret text $<p>$ as a key. Specifically, the first key-reveal-sorting part 52 performs key-reveal sort written as follows.

$$<m'> \leftarrow \text{RevealSort}(<m>;<p>) \qquad \text{[Formula 16]}$$

At step S53, the second stable-sorting part 53 alternately breaks down the elements of the secret text $<m'>$ to generate secret texts $<m_0>, <m_1>$. Specifically, the second stable-sorting part 53 generates secret texts $<m_0>, <m_1>$ for $h=0, \ldots, n-1$ in accordance with the following formula.

$$<m_0[h]> \leftarrow <m'[2h]>,$$

$$<m_1[h]> \leftarrow <m'[2h+1]> \qquad \text{[Formula 17]}$$

The second stable-sorting part 53 then generates a secret text $(<t''_{0}>, <p_0>)$ by stably sorting $(<t'_{i,j}>, <(0, \ldots, n-1)]>$ using $\neg <t'_{i,j}>$ as a key, generates a secret text $<m''_0>$ by stably sorting the secret text $<m_0>$ using $\neg <b'_{i,j}>$ as a key, generates a secret text $(<b''_1>, <p_1>)$ by stably sorting $(<b'_{j,k}>, <(0, \ldots, n-1)>)$ using $\neg <b'_{j,k}>$ as a key, and generates a secret text $<m''_1>$ by stably sorting the secret text $<m_1>$ using $\neg <t'_{j,k}>$ as a key. Specifically, the second stable-sorting part 53 performs the four stable sort operations given below.

$$(<t''_0>,<p_0>) \leftarrow \text{StableSort}(<t'_{i,j}>,<(0,\ldots,n-1)>;\neg<t'_{i,j}>),$$

$$<m''_0> \leftarrow \text{StableSort}(<m_0>;\neg b'_{i,j}>),$$

$$(<b''_1>,<p_1>) \leftarrow \text{StableSort}(<b'_{j,k}>,<(0,\ldots,n-1)>;\neg<b'_{j,k}>),$$

$$<m''_1> \leftarrow \text{StableSort}(<m_1>;\neg<t'_{j,k}>) \quad \text{[Formula 18]}$$

At step S54, the second key-reveal-sorting part 54 generates secret texts <t''>, <b''> in accordance with the following formula.

$$<t''> \leftarrow <t''_0> \times <m''_0>,$$

$$<b''> \leftarrow <b''_1> \times <m''_1> \quad \text{[Formula 19]}$$

The second key-reveal-sorting part 54 then generates a secret text $<t'_{j,k}>$ by key-reveal sorting the secret text <t''> using a secret text $<p_0>$ as a key and generates a secret text $<b'_{j,k}>$ by key reveal sorting the secret text <b''> using a secret text $<p_1>$ as a key. Specifically, the second key-reveal-sorting part 54 performs the two key reveal sort operations given below.

$$<t'> \leftarrow \text{RevealSort}(<t''>;<p_0>),$$

$$<b'> \leftarrow \text{RevealSort}(<b''>;<p_1>) \quad \text{[Formula 20]}$$

At step S50b, the merging part 50 determines whether all of the secret texts $<t'_{0,1}>, \ldots, <t'_{m-1,m}>$ and the secret texts $<b'_{0,1}>, \ldots, <b'_{m-1,m}>$ have been merged. In other words, the merging part 50 determines whether secret texts ($<t'_{0,m}>$, $<b'_{0,m}>$) have been generated. If the merge has not been completed, the process returns to step S50a. If the merge has been completed, the process proceeds to step S60.

At step S60, the determining part 60 computes $<t'_{0,m}[0]> \vee <t'_{0,m}[1]> \vee \ldots \vee <t'_{0,m}[m-1]>$ by using the secret text $<t'_{0,m}>$ and outputs the result as the result of the determination.

The idea of the second embodiment described previously may be applied to the merging part 50 of the third embodiment and the merging part 50 may be configured to set i, j and k so as to satisfy the formula given below and select a secret text ($<t'_{i,j}>$, $<b'_{i,j}>$) and a secret text ($<t'_{i,k}>$, $<b'_{j,k}>$).

$$j = \left\lfloor \frac{i+k}{2} \right\rfloor \quad \text{[Formula 21]}$$

Effects of the Invention

The nondecreasing sequence determining technique according to the present invention determines whether a nondecreasing sequence exists or not by selecting values one by one from each of m sets in only O(log m) rounds of recursive procedure. Especially when the determination performed using secure computation, the whole processing can be accomplished only O(log m) rounds because each iteration of the recursive procedure can be accomplished in O(1) rounds of computation.

Key Points of the Invention

In the present invention, when determination is made as to whether a nondecreasing sequence exits by selecting values one by one from each of m sets, a set of nondecreasing sequences is recursively constructed by divide and conquer to determine whether a nondecreasing sequence exists in O(log m) rounds. In the divide and conquer, computations are performed by keeping only sets of good-natured nondecreasing sequences that can be efficiently computed, rather than keeping all nondecreasing sequences, thereby accomplishing merge of sets of nondecreasing sequences by secure computation in O(1) rounds. Consequently, the whole computations can be accomplished by O(log m) rounds of secure computation.

It would be understood that the present invention is not limited to the embodiments described above and modifications can be made without departing from the spirit of the present invention. The operations described above may be performed not only in time sequence as is written but also in parallel or individually, depending on the throughput of the devices that perform the processes or requirements.

[Program and Recording Media]

If the processing functions of the devices described above are implemented by a computer, processing of the function that each device needs to include is described in a program. The program is executed on the computer to implement the processing functions described above on the computer.

The program describing the processing can be recorded on a computer-readable recording medium. The computer-readable recording medium may be any medium such as a magnetic recording device, an optical disc, a magneto-optical recording medium, and a semiconductor memory, for example.

The program may be distributed, for example, by selling, transferring, or lending portable recording media on which the program is recorded, such as DVDs or CD-ROMs. The program may be stored on a storage device of a server computer and transferred from the server computer to other computers over a network, thereby distributing the program.

A computer that executes the program first stores the program recorded on a portable recording medium or the program transferred from a server computer into a storage device of the computer. When the computer executes the processes, the computer reads the program stored in the storage device of the computer and executes the processes according to the read program. In another mode of execution of the program, the computer may read the program directly from a portable recording medium and may execute the processes according to the program or may execute the processes according to the program each time the program is transferred from the server computer to the computer. Alternatively, the processes may be executed using a so-called ASP (Application Service Provider) service in which the program is not transferred from a server computer to the computer but processing functions are implemented only by instructions to execute the program and acquisition of the results of the execution. It should be noted that the program in this mode comprises information that is made available for use in processing by an electronic computer and is equivalent to a program (such as data that is not direct commands to the computer but has the nature of defining processing performed by the computer).

While a given program is executed on a computer to configure the present device in this mode, at least part of the processes may be implemented by hardware.

What is claimed is:

1. A nondecreasing sequence determining device comprising:
   processing circuitry configured to
   take electronic data inputs of m sets $P_0, \ldots, P_{m-1}$ and sorting elements of a set $P_i$ in ascending order for i=0, ..., m−1 to generate a vector $t_{i,i+1}$ and a vector $b_{i,i+1}$;

perform a merging process of merging vectors $t_{0,1}, \ldots, t_{m-1,m}$ to generate a vector $t_{0,m}$ and merging vectors $b_{0,1}, \ldots, b_{m-1,m}$ to generate a vector $b_{0,m}$ by repeating a process of merging vectors $(t_{i,j}, b_{i,j})$ and vectors $(t_{j,k}, b_{j,k})$ that satisfy $0 \leq i < j < k \leq m$ to generate vectors $(t_{i,k}, b_{i,k})$; and output a result of determination that indicates the absence of a nondecreasing sequence if the length of the vector $t_{0,m}$ is 0 and output a result of determination that indicates the presence of a nondecreasing sequence if the length of the vector $t_{0,m}$ is greater than or equal to 1;

wherein the merging process further comprises:
coupling a vector $b_{i,j}$ with a vector $t_{j,k}$ and stably sorting elements of a resulting vector to generate a vector e;
searching the vector e for every set of $(\lambda, x, y)$ in which $e[\lambda]$ is $b_{i,j}[x]$ and $e[\lambda+1]$ is $t_{j,k}[y]$ and generating a set X including all of found x and a set Y including all of found y; and
sorting elements $t_{i,j}[x]$ $(x \in X)$ of a vector $t_{i,j}$ in ascending order to generate a vector $t_{i,k}$ and sorting elements $b_{j,k}[y]$ $(y \in Y)$ of a vector $b_{j,k}$ in ascending order to generate a vector $b_{i,k}$, wherein the nondecreasing sequence determining device is configured to perform pattern matching by determining whether or not the nondecreasing sequence can be created when elements are selected, one by one, from the sets $P_0, \ldots, P_{m-1}$, wherein the indication of the presence of the nondecreasing sequence indicates that the sets $P_0, \ldots, P_{m-1}$ include positions where the partial character strings included in a pattern appear in an electronic text.

2. A nondecreasing sequence determining device, comprising:
processing circuitry configured to
take electronic data inputs of m sets $P_0, \ldots, P_{m-1}$ and sorting elements of a set $P_i$ in ascending order for $i=0, \ldots, m-1$ to generate a vector $t_{i,i+1}$ and a vector $b_{i,i+1}$;

generate an encrypted text $<t'_{i,i+1}>$ in which a vector $t'_{i,i+1}$ is concealed and generating an encrypted text $<b'_{i,i+1}>$ in which a vector $b'_{i,i+1}$ is concealed, wherein, in the vector $t'_{i,i+1}$, $t'_{i,i+1}[k]=1$ is set if $\lambda$ that satisfies $t_{i,i+1}[\lambda]$k exists for $k=0, n-1$ and $\lambda=0, \ldots, m-1$, otherwise, $t'_{i,i+1}[k]=0$ is set, and in the vector $b'_{i,i+1}$, $b'_{i,i+1}[k]=1$ is set if $\lambda$ that satisfies $b_{i,i+1}[\lambda]=k$ exists, otherwise $b'_{i,i+1}[k]=0$ is set, where each of elements of the sets $P_0, \ldots, P_{M-1}$ is greater than 0 or equal to 0 and less than n;

perform a merging process of merging secret texts $<t'_{0,1}>, \ldots, <t'_{m-1,m}>$ to generate a secret text $<t'_{0,m}>$ and merging secret texts $<b'_{0,1}>, \ldots, <b'_{m-1,m}>$ to generate a secret text $<b'_{0,m}>$ by repeating a process of merging secret texts $(<t'_{i,j}>, <b'_{i,j}>)$ and $(<t'_{j,k}>, <b'_{j,k}>)$ that satisfy $0 \leq i < j < k \leq m$ to generate a secret text $(<t'_{i,k}>, <b'_{i,k}>)$; and calculate $<t'_{0,m}[0]> \vee <t'_{0,m}[1]> \vee \ldots \vee <t'_{0,m}[m-1]>$ by using the secret text $<t'_{0,m}>$ and output the result of the calculation as the result of determination;

wherein the merging process further comprises:
alternately arranging elements of secret texts $<b'_{i,j}>$ and $<t'_{j,k}>$ to generate a secret text $<a>$ and stable-sorting a secret text $(<(0,1)^n>, <a>, <0, \ldots, 2n-1>)$ by using $\neg <a>$ as a key to generate a secret text $(f<f>, <a'>, <p>)$;

calculating $<a[h]> \times (\neg <f'[h]> \times <f'[h+1]> + <f'[h]> \times \neg <f'[h-1]>)$ for $h=0, \ldots, n-1$ to generate a secret text $<m>$ and key-reveal sorting the secret text $<m>$ by using a secret text $<p>$ to generate a secret text $<m'>$;

alternately breaking down elements of the secret text $<m>$ to generate secret texts $<m_0>$ and $<m_1>$, stably sorting $(<t'_{i,j}>, <(0, \ldots, n-1)>)$ by using $\neg <t'_{i,j}>$ as a key to generate a secret text $(<t''_0>, <p_0>)$, stably sorting the secret text $<m_0>$ by using $\neg <b'_{j,k}>$ as a key to generate a secret text $<m''_0>$, stably sorting $(<b'_{j,k}>, <(0, \ldots, n-1)>)$ by using $\neg <b'_{j,k}>$ as a key to generate a secret text $(<b''_1>, <p_1>)$, and stably sorting the secret text $<m_1>$ by using $\neg <t'_{j,k}>$ as a key to generate a secret text $<m''_1>$; and generating a secret text $<t''>$ that is the product of a secret text $<t''_0>$ and a secret text $<m''_0>$, and a secret text $<b''>$ that is the product of a secret text $<b''_1>$ and a secret text $<m''_1>$, key-reveal sorting the secret text $<t''>$ by using a secret text $<p_0>$ as a key to generate a secret text $<t'_{i,k}>$, and key-reveal sorting the secret text $<b''>$ by using a secret text $<p_1>$ as a key to generate a secret text $<b'_{i,k}>$, where $(0, 1)^n$ is a vector being composed of 0s and 1s and having a length of 2n and $\neg \bullet$ denotes the negation of $\bullet$, wherein the nondecreasing sequence determining device is configured to perform pattern matching by determining whether or not a nondecreasing sequence can be created when elements are selected, one by one, from the sets $P_0, \ldots, P_{m-1}$, wherein an indication of the presence of the nondecreasing sequence indicates that the sets $P_0, \ldots, P_{m-1}$ include positions where the partial character strings included in a pattern appear in an electronic text.

3. The nondecreasing sequence determining device according to claim 1 or 2,
wherein the merging process selects i, j, and k that satisfy the following formula:

$$j = \left\lfloor \frac{i+k}{2} \right\rfloor. \qquad \text{[Formula 22]}$$

4. A nondecreasing sequence determining method, implemented by a nondecreasing sequence determining device, comprising:
a sorting step of taking, by a sorting part, electronic data inputs of m sets $P_0, \ldots, P_{m-1}$ and sorting elements of a set $P_i$ in ascending order for $i=0, \ldots, m-1$ to generate a vector $t_{i,i+1}$ and a vector $b_{i,i+1}$, a merging step of merging, by a merging part, vectors $t_{0,1}, \ldots, t_{m-1,m}$ to generate a vector $t_{0,m}$ and merging vectors $b_{0,1}, \ldots, b_{m-1,m}$ to generate a vector $b_{0,m}$ by repeating a process of merging vectors $(t_{i,j}, b_{i,j})$ and vectors $(t_{j,k}, b_{j,k})$ that satisfy $0 \leq i < j < k \leq m$ to generate vectors $(t_{i,k}, b_{i,k})$; and a determining step of outputting, by a determining part, a result of determination that indicates the absence of a nondecreasing sequence if the length of the vector $t_{0,m}$ is 0 and outputting a result of determination that indicates the presence of a nondecreasing sequence if the length of the vector $t_{0,m}$ is greater than or equal to 1;

wherein the merging step comprises:
a stable-sorting step of coupling, by a stable-sorting part, a vector $b_{i,j}$ with a vector $t_{j,k}$ and stably sorting elements of a resulting vector to generate a vector e;

a searching step of searching, by a searching part, the vector e for every set of (λ, x, y) in which e[λ] is $b_{i,j}$[x] and e[λ+1] is $t_{j,k}$[y] and generating a set X including all of found x and a set Y including all of found y; and an extracting step of sorting, by an extracting part, elements $t_{i,j}$[x] (x∈X) of a vector $t_{i,j}$ in ascending order to generate a vector $t_{i,k}$ and sorting elements $b_{j,k}$[y] (y∈Y) of a vector $b_{j,k}$ in ascending order to generate a vector $b_{i,k}$, wherein the nondecreasing sequence determining device is configured to perform pattern matching by determining whether or not the nondecreasing sequence can be created when elements are selected, one by one, from the sets $P_0, \ldots, P_{m-1}$, wherein the indication of the presence of the nondecreasing sequence indicates that the sets $P_0, \ldots, P_{m-1}$ include positions where the partial character strings included in a pattern appear in an electronic text.

5. A nondecreasing sequence determining method, implemented by a nondecreasing sequence determining device, comprising:

a sorting step of taking, by a sorting part, electronic data inputs of m sets $P_0, \ldots, P_{m-1}$ and sorting elements of a set $P_i$ in ascending order for i=0, ..., m-1 to generate a vector $t_{i,i+1}$ and a vector $b_{i,i+1}$;

a concealing step of generating, by a concealing part, an encrypted text $<t'_{i,i+1}>$ in which a vector $t'_{i,i+1}$ is concealed and generating an encrypted text $<b'_{i,i+1}>$ in which a vector $b'_{i,i+1}$ is concealed, wherein, in the vector $t'_{i,i+1}$, $t'_{i,i+1}[k]=1$ is set if λ that satisfies $t_{i,i+1}[λ]$k exists for k=0, ..., n-1 and λ=0, ..., m-1, otherwise, $t'_{i,i+1}[k]=0$ is set, and in the vector $b'_{i,i+1}$, $b'_{i,i+1}[k]=1$ is set if λ that satisfies $b_{i,i+1}[λ]=k$ exists, otherwise $b'_{i,i+1}[k]=0$ is set, where each of elements of the sets $P_0, \ldots, P_{M-1}$ is greater than 0 or equal to 0 and less than n;

a merging step of merging, by a merging part, secret texts $<t'_{0,1}>, \ldots, <t'_{m-1,m}>$ to generate a secret text $<t'_{0,m}>$ and merging secret texts $<b'_{0,1}>, \ldots, <b'_{m-1,m}>$ to generate a secret text $<b'_{0,m}>$ by repeating a process of merging secret texts ($<t'_{i,j}>, <b'_{i,j}>$) and ($<t'_{j,k}>, <b'_{j,k}>$) that satisfy 0≤i<j<k≤m to generate a secret text ($<t'_{i,k}>, <b'_{i,k}>$); and a determining step of calculating, by a determining part, $<t'_{0,m}[0]> \vee <t'_{0,m}[1]> \vee \ldots \vee <t'_{0,m}[m-1]>$ by using the secret text $<t'_{0,m}>$ and outputting the result of the calculation as the result of determination;

wherein the merging step comprises:

a first stable-sorting step of alternately arranging, by a first stable-sorting part, elements of secret texts $<b'_{i,j}>$ and $<t'_{j,k}>$ to generate a secret text $<a>$ and stably sorting a secret text ($<(0,1)^n>, <a>, <(0, \ldots, 2n-1)>$) by using ¬$<a>$ as a key to generate a secret text ($<f>$, $<a'>$, $<p>$);

a first key-reveal-sorting step of calculating, by a first key-reveal-sorting part, $<a[h]>\times(¬<f'[h]>\times<f'[h+1]>+ <f'[h]>\times¬<f'[h-1]>)$ for h=0, ..., n-1 to generate a secret text $<m>$ and key-reveal sorting the secret text $<m>$ by using a secret text $<p>$ to generate a secret text $<m'>$;

a second stable-sorting step of alternately breaking down, by a second stable-sorting part, elements of the secret text $<m>$ to generate secret texts $<m_0>$ and $<m_1>$, stably sorting ($<t'_{i,j}>, <(0, \ldots, n-1)>$) by using ¬$<t'_{i,j}>$ as a key to generate a secret text ($<t''_0>, <p_0>$), stably sorting the secret text $<m_0>$ by using ¬$<b'_{i,j}>$ as a key to generate a secret text ($<m''_0>$), stably sorting ($<b'_{i,j}>, <(0, \ldots, n-1)>$) by using ¬$<b'_{i,j}>$ as a key to generate a secret text ($<b''_1>, <p_1>$), and stably sorting the secret text $<m_1>$ by using ¬$<t'_{j,k}>$ as a key to generate a secret text $<m''_1>$; and a second key-reveal-sorting step of generating, by a second key-reveal-sorting part, a secret text $<t''>$ that is the product of a secret text $<t''_0>$ and a secret text $<m''_0>$, and a secret text $<b''>$ that is the product of a secret text $<b''_1>$ and a secret text $<m''_1>$, key-reveal sorting the secret text $<t''>$ by using a secret text $<p_0>$ as a key to generate a secret text $<t'_{i,k}>$, and key-reveal sorting the secret text $<b''>$ by using a secret text $<p_1>$ as a key to generate a secret text $<b'_{i,k}>$, where $(0, 1)^n$ is a vector being composed of 0s and 1s and having a length of 2n and ¬● denotes the negation of ●, wherein the nondecreasing sequence determining device is configured to perform pattern matching by determining whether or not a nondecreasing sequence can be created when elements are selected, one by one, from the sets $P_0, \ldots, P_{m-1}$, wherein an indication of the presence of the nondecreasing sequence indicates that the sets $P_0, \ldots, P_{m-1}$ include positions where the partial character strings included in a pattern appear in an electronic text.

6. The nondecreasing sequence determining method according to claim 4 or 5, wherein the merging step selects i, j, and k that satisfy the following equation:

$$j = \left\lfloor \frac{i+k}{2} \right\rfloor.$$ [Formula 23]

7. A non-transitory computer readable medium including computer executable instructions that make a computer function as the nondecreasing sequence determining device according to claim 1 or 2.

8. A non-transitory computer readable medium including computer executable instructions that make a computer function as the nondecreasing sequence determining device according to claim 3.

* * * * *